(12) United States Patent
Hokao

(10) Patent No.: US 8,040,866 B2
(45) Date of Patent: Oct. 18, 2011

(54) CDMA-BASED MOBILE TERMINAL, CDMA-BASED MOBILE COMMUNICATION METHOD, AND COMMUNICATION QUALITY ESTIMATING METHOD

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 1059 days.

(21) Appl. No.: 11/886,771

(22) PCT Filed: Mar. 16, 2006

(86) PCT No.: PCT/JP2006/305202
§ 371 (c)(1),
(2), (4) Date: Sep. 20, 2007

(87) PCT Pub. No.: WO2006/100994
PCT Pub. Date: Sep. 28, 2006

(65) Prior Publication Data
US 2009/0052403 A1 Feb. 26, 2009

(30) Foreign Application Priority Data
Mar. 24, 2005 (JP) ................................. 2005-085448

(51) Int. Cl.
*H04B 7/216* (2006.01)
*H04B 17/00* (2006.01)
(52) U.S. Cl. ..................... 370/342; 370/441; 455/226.2; 455/226.3
(58) Field of Classification Search .................. None
See application file for complete search history.

(56) References Cited

U.S. PATENT DOCUMENTS

| 6,587,696 B1 * | 7/2003 | Ma et al. ...................... 455/522 |
| 2002/0097780 A1 * | 7/2002 | Odenwalder et al. .......... 375/146 |
| 2002/0111158 A1 * | 8/2002 | Tee ............................... 455/421 |
| 2002/0193135 A1 | 12/2002 | Nakano |

(Continued)

FOREIGN PATENT DOCUMENTS

JP 8-191481 7/1996

(Continued)

OTHER PUBLICATIONS

Japanese Office Action dated Sep. 2, 2009 and partial English translation thereof.

*Primary Examiner* — Gregory Sefcheck
*Assistant Examiner* — Ashley Shivers
(74) *Attorney, Agent, or Firm* — McGinn Intellectual Property Law Group, PLLC

(57) ABSTRACT

A mobile terminal comprises an antenna, radio unit, signal processing unit, signal analyzer unit, received signal information storage unit, and reception quality storage unit. Signal processing unit comprises a received signal processing unit and notified information processing unit, while the received signal information storage unit comprises a common pilot channel information storage unit and common control channel information storage unit. Received signal processing unit measures the reception quality of a common pilot channel and stores it in the common pilot channel information storage unit. Notified information processing unit extracts transmission power of the common pilot channel and common control channel from report information, and then stores them in the common control channel information storage unit. Signal analyzer unit calculates the reception quality of the common control channel and the interference signal level, based on the information stored in the received signal information storage unit.

19 Claims, 11 Drawing Sheets

U.S. PATENT DOCUMENTS

| | | | |
|---|---|---|---|
| 2003/0083092 A1* | 5/2003 | Kim et al. | 455/522 |
| 2003/0179727 A1* | 9/2003 | Soong et al. | 370/328 |
| 2004/0001472 A1 | 1/2004 | Kwak et al. | |
| 2004/0160933 A1* | 8/2004 | Odenwalder et al. | 370/342 |

FOREIGN PATENT DOCUMENTS

| | | |
|---|---|---|
| JP | 8-214361 | 8/1996 |
| JP | 2001-7761 | 1/2001 |
| JP | 2001-36462 | 2/2001 |
| JP | 2003-78480 | 3/2003 |
| JP | 2003-244058 | 8/2003 |
| JP | 2003-283425 | 10/2003 |
| JP | 2003-298498 | 10/2003 |
| JP | 2004-40778 | 2/2004 |
| JP | 2004-235910 | 8/2004 |
| JP | 2004-254239 | 9/2004 |
| JP | 2004-274745 | 9/2004 |
| JP | 2005-507605 | 3/2005 |
| WO | WO 02/37715 A1 | 5/2002 |

* cited by examiner

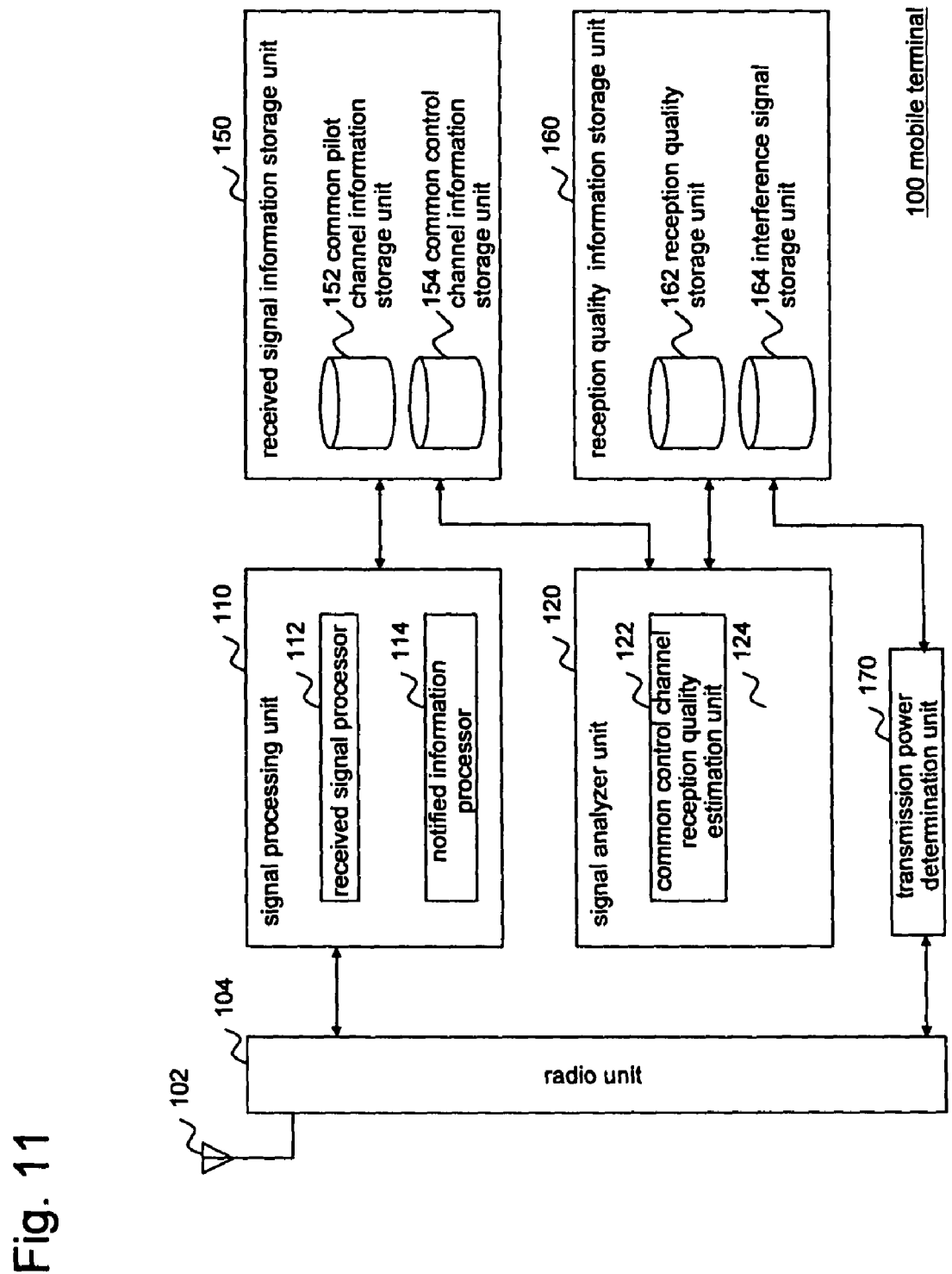

CDMA-BASED MOBILE TERMINAL, CDMA-BASED MOBILE COMMUNICATION METHOD, AND COMMUNICATION QUALITY ESTIMATING METHOD

TECHNICAL FIELD

The present invention relates to a CDMA-based mobile terminal, a CDMA-based mobile communication method, and a communication quality estimating method.

BACKGROUND ART

A CDMA-based mobile terminal, when receiving on an individual traffic channel, conducts closed-loop power control between the mobile terminal and a network so as to optimize the reception quality (JP2001-7761A).

However, since a common control channel (CCCH) for use in call control is shared by users of other mobile terminals, power control cannot be conducted during reception on the common control channel. For this reason, depending on radio environments, reception of the common control channel cannot be performed, in which case the mobile terminal will suffer from a failure in call connection, a delay in connection as a result of re-transmission.

DISCLOSURE OF THE INVENTION

It is therefore an object of the present invention to solve problems as mentioned above, such as a failure in call connection, a delay in connection, and the like that result from disabled reception on a common control channel.

According to the present invention, a CDMA-based mobile terminal is provided, characterized by comprising:

a received signal processing unit for measuring the reception quality of a common pilot channel in a received signal;

a notified information processing unit for extracting power information related to transmission power of a common control channel from report information notified from a base station; and a signal analyzer unit for calculating the reception quality of the common control channel and the interference signal level based on the reception quality and the power information.

Also, according to the present invention, a communication quality estimating method is provided for estimating the communication quality in a CDMA-based mobile communication. The method is characterized by comprising the steps of:

measuring the reception quality of a common pilot channel in a received signal;

extracting power information related to transmission power of a common control channel from report information notified from a base station; and calculating the reception quality of the common control channel and the interference signal level based on the reception quality and the power information.

Also, according to the present invention, a CDMA-based mobile communication method is provided, characterized by comprising the steps of:

measuring the reception quality of a common pilot channel on a received signal, at which reception fails on a common control channel;

extracting power information related to transmission power of a common control channel from report information notified from a base station;

calculating the reception quality of the common control channel on the received signal and an interference signal level based on the reception quality and the power information;

storing the calculated reception quality of the common control channel and the interference signal level as reception unavailability information; and determining whether or not a connection can be made to a network based on the reception unavailability information.

In the present invention, (i) the reception quality of the common pilot channel is measured from the received signal, and power information related to the transmission power of the common control channel is extracted from the report information, and (ii) the reception quality of the common control channel and the interference signal level are calculated by using them. By utilizing the reception quality and interference signal level calculated here, it is possible to effectively prevent a failure in call connection resulting from a failed reception on the common control channel, and a delay in connection due to re-transmission.

A variety of aspects can be employed in utilizing the calculated reception quality and interference signal level. For example, situations are stored as a statistic when the reception failed on the common control channel in the past, and adjoining cells and networks can be searched during a waiting state or upon start of call connection such that the common control channel can always be received, or the network can be requested to change the frequency or communication system. Also, by providing a frequency dedicated to the common control channel on the network, the transmission power of the common control channel can be controlled in response to a request from the mobile terminal without experiencing interference of individual traffic channels or while preventing the influence of other users on reception quality.

Figure 1:
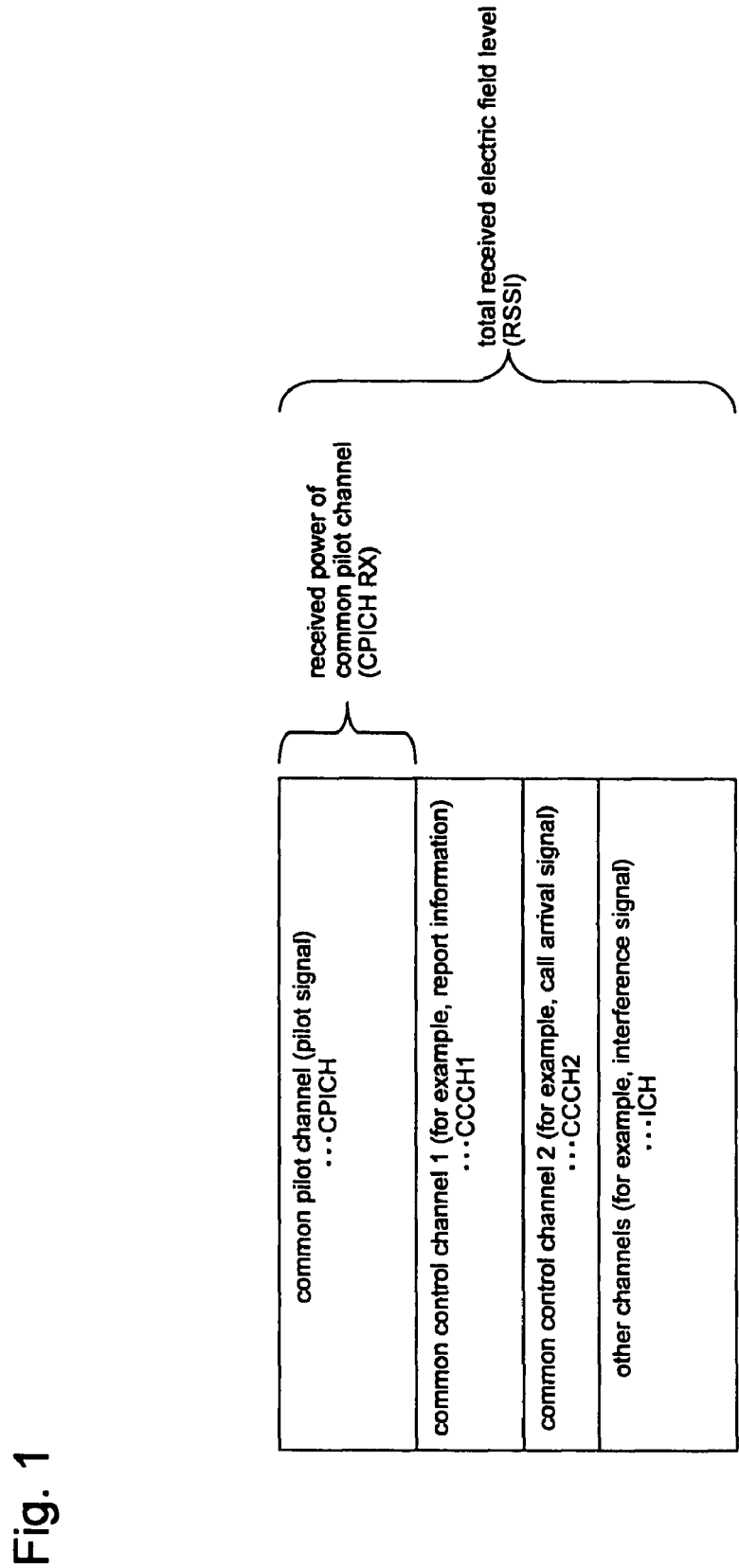
FIG. 1

A diagram for describing signals received by a mobile terminal, and information measured from the signal.

FIG. 2

A diagram for describing the contents of report information.

FIG. 3

A diagram for describing a method of estimating a reception level on a common control channel and an interference signal level by a mobile terminal.

FIG. 4

A diagram illustrating an example of a configuration of a mobile terminal according to a first exemplary embodiment of the present invention.

FIG. 5

A flow chart for describing an example of operations of a mobile terminal according to a second exemplary embodiment of the present invention.

FIG. 6

A diagram illustrating an example of a configuration of a mobile terminal according to the second and third exemplary embodiments of the present invention.

FIG. 7

A flow chart for describing an example of operations of the mobile terminal according to the third exemplary embodiment of the present invention.

FIG. 8

A flow chart for describing an example of operations of a mobile terminal according to a fourth exemplary embodiment of the present invention.

FIG. 9

A diagram illustrating an example of a configuration of the mobile terminal according to the fourth exemplary embodiment of the present invention.

FIG. 10

A diagram for describing power control on a network side according to a fifth exemplary embodiment of the present invention.

FIG. 11

A diagram illustrating an example of a configuration of a mobile terminal according to the fifth exemplary embodiment of the present invention.

BEST MODE FOR CARRYING OUT THE INVENTION

In the following, exemplary embodiments of the present invention will be described with reference to the drawings. In all drawings, similar components are designated similar reference numerals, and descriptions thereon are omitted as appropriate.

First Exemplary Embodiment

Generally, a CDMA-based mobile terminal always monitors and compares the reception quality of a common pilot channel (CPICH) used to transmit pilot signals from a currently used cell and its adjoining cells to select and use a cell which has higher reception quality.

Here, the reception quality is calculated using received code power (RSCP) of the common pilot channel, and the proportion (Ec/No) of the received code power of the common pilot channel which occupies the total received electric field level (RSSI)

However, the common control channel (channel for transmitting control signals such as a call arrival signal and the like) used for call control is a different channel which is spread code multiplexed on the common pilot channel. The ratio of their multiplexed power (ratio of the code power of the common pilot channel to the code power of the common control channel) depends on the type of common control channel, and also depends on a network (cell). Also, when using the reception quality of the common pilot channel mentioned above, no consideration can be given to the interference signal level on the common control channel.

On the other hand, the present invention utilizes not only a reception quality on a common pilot channel but also a signal quality and an interference signal level on a common control channel, to improve the reception characteristic of the common control channel.

Specifically, the reception quality and interference signal level on the common control channel are estimated from the reception quality on the common pilot channel and power information on the common control channel notified from a network. In the following, an example of a mobile terminal in a waiting state is shown.

Figure 2:
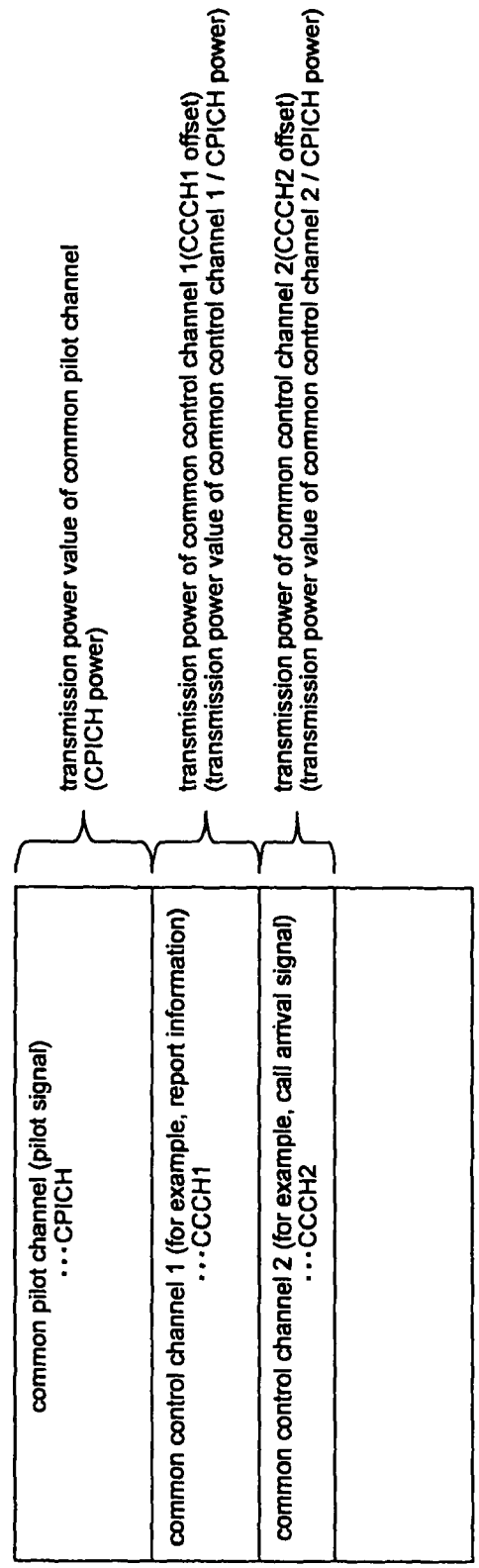
Figure 3:
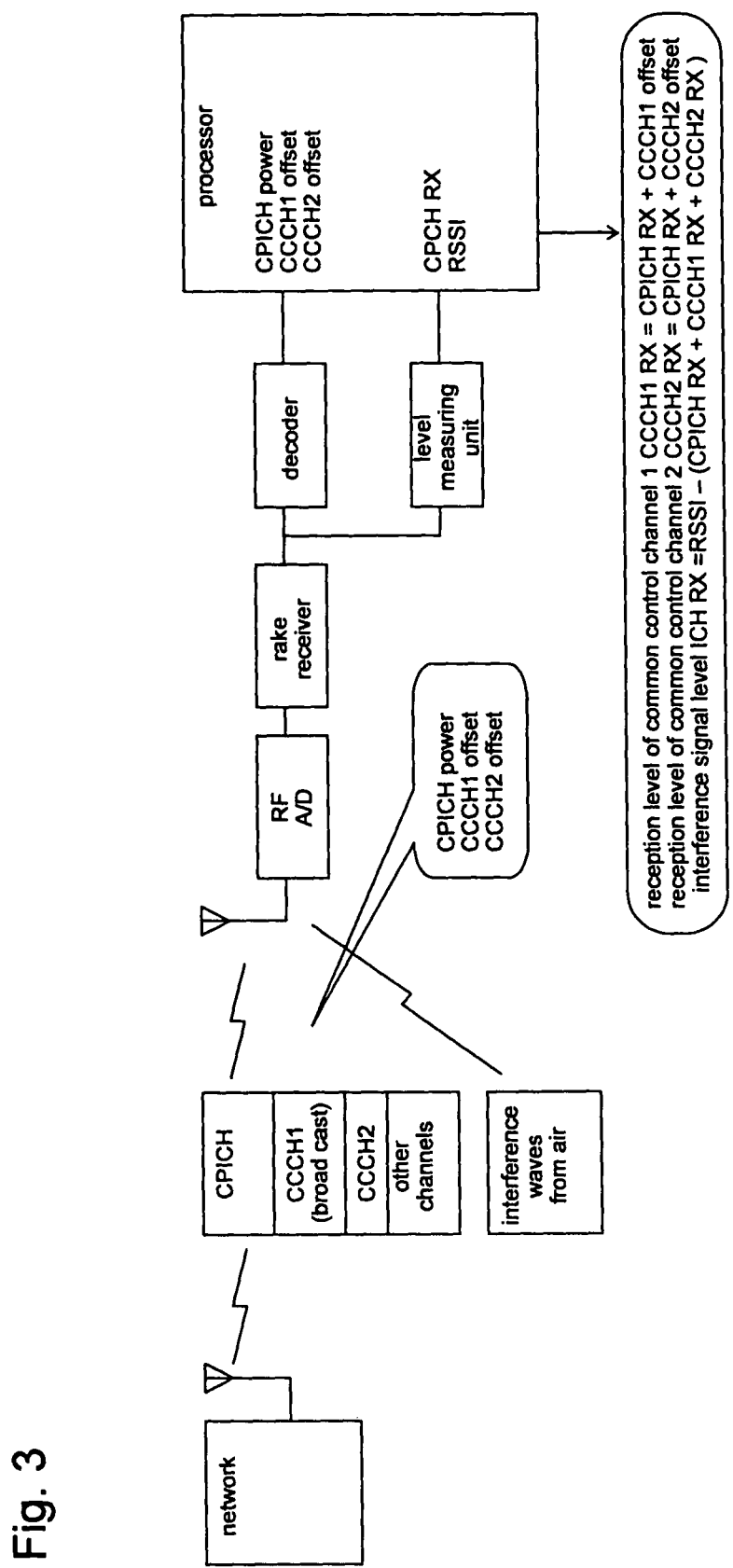

FIG. 1 shows signals received and information measured by the mobile terminal, FIG. 2 shows information notified from a network (cell) to the mobile terminal through report information, and FIG. 3 shows a method of estimating the reception level and the interference signal level on a common control channel by the mobile terminal. In FIGS. 1 to 3, respective symbols have the following meanings.

Transmission Power Value on Common Pilot Channel: CPICH power;

Reception Level on Common Control Channel 1: CCCH1 RX;

Reception Level on Common Control Channel 2: CCCH2 RX;

Transmission Power on Common Control Channel 1: CCCH1 offset;

Transmission Power on Common Control Channel 2: CCCH2 offset;

Reception Power on Common Pilot Channel: CPICH RX;

Total Received Electric Field Level: RSSI; and

Interference Signal Level: ICH RX

As shown in FIG. 1, the mobile terminal receives a pilot signal from the common pilot channel (CPICH), receives a control signal such as report information from common control channel 1 (CCCH1), receives a control signal such as a call arrival signal from common control channel 2 (CCCH2), and receives signals including an interference signal from another channel (ICH). The mobile terminal also measures the total received electric field level (RSSI) and reception power (CPICH RX) on the common pilot channel.

As shown in FIG. 2, the mobile terminal is notified of the transmission power value (CPICH power) of the common pilot channel and the transmission power (CCCH1 offset, CCCH2 offset) of common control channels 1, 2 from report information broadcast from a base station, not shown. The transmission power of common control channels 1, 2 is calculated by dividing the transmission power values of common control channels 1, 2 by the transmission power value (CPICH power) of the common pilot channel.

As shown in FIG. 3, the mobile terminal calculates reception levels (CCCH1 RX, CCCH2 RX) of common control channels 1, 2, and the interference signal level (ICH RX) using the total received electric field level (RSSI) and the reception power (CPICH RX) on the common pilot channel, measured in FIG. 1, and the transmission power value (CPICH power) of the common pilot channel and the transmission power (CCCH1 offset, CCCH2 offset) of common control channels 1, 2, notified in FIG. 2.

Figure 4:
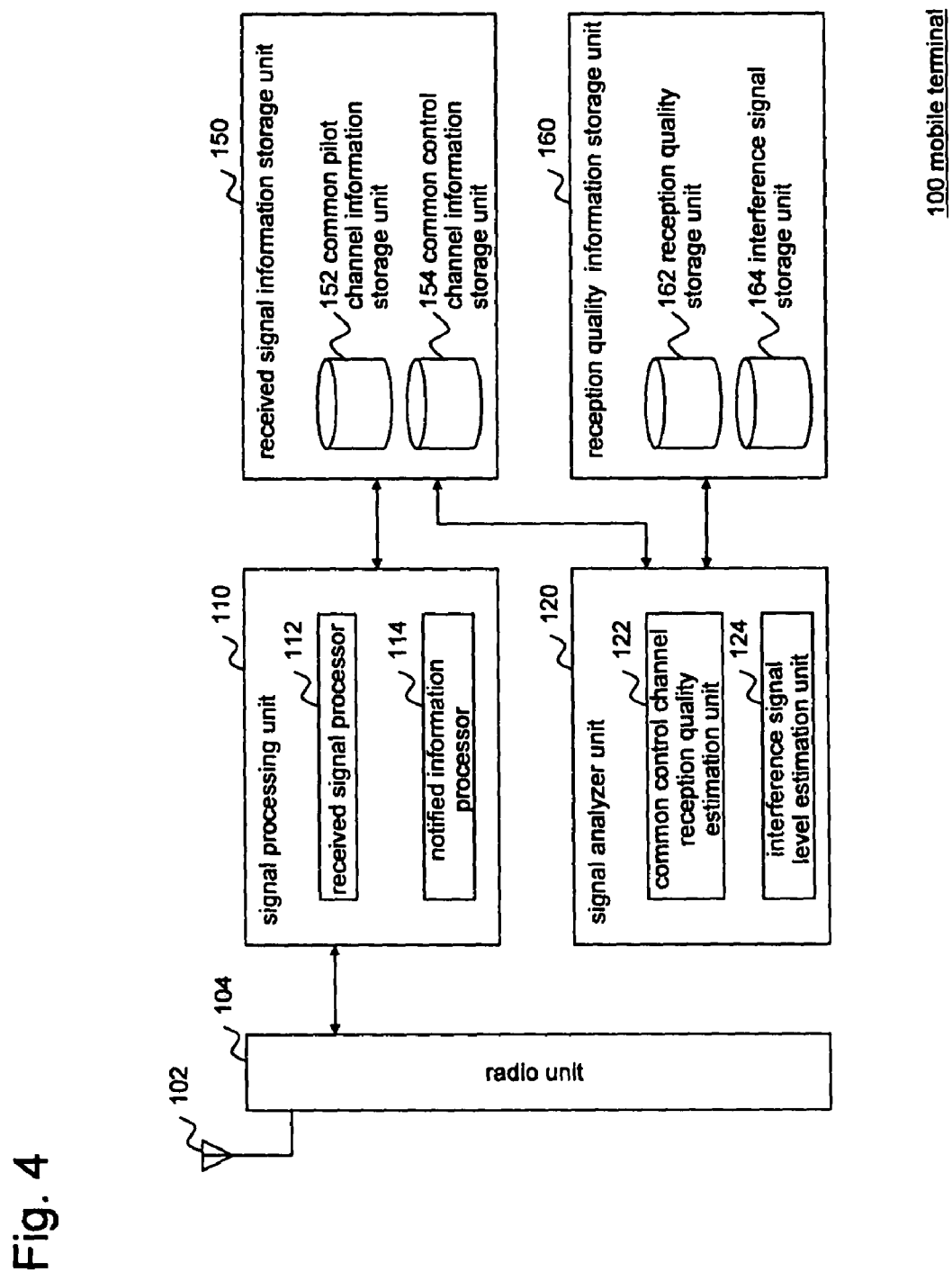

FIG. 4 illustrates functional blocks of an example of a CDMA-based mobile terminal which performs the functions shown in FIG. 3.

As illustrated in FIG. 4, mobile terminal 100 comprises antenna 102, radio unit 104, signal processing unit 110, signal analyzer unit 120, received signal information storage unit 150, and reception quality information storage unit 160.

Signal processing unit 110 comprises received signal processor 112 and notified information processor 114. Signal analyzer unit 120 comprises common control channel reception quality estimation unit 122 and interference signal level estimation unit 124. Received signal information storage unit 150 comprises common pilot channel information storage unit 152 and common control channel information storage unit 154. Reception quality information storage unit 160 comprises reception quality storage unit 162 and interference signal storage unit 164.

Radio unit 104 receives a signal from a network (cell) through antenna 102. Specifically, radio unit 104 receives a pilot signal from a common pilot channel, receives a control signal such as report information from common control channel 1, receives a control signal such as a call arrival signal from common control channel 2, and receives signals including an interference signal from another channel, as shown in FIGS. 1 and 3.

Signal processing unit 110 processes the signal received by radio unit 104.

Received signal processor 112 functions to measure the reception quality of the common pilot channel in a received signal. Specifically, received signal processor 112 measures the total received electric field level (RSSI), and the reception power (CPICH RX) of the common pilot channel, as shown in FIGS. 1 and 3, and stores these measurements in common pilot channel information storage unit 152.

Notified information processor 114 extracts the transmission power value (CPICH power) of the common pilot channel, and the transmission power (CCCH1 offset, CCCH2 offset) of common control channels 1, 2 from the report information broadcast from a base station (not shown), as shown in FIGS. 2 and 3, respectively, and stores them in common control channel information storage unit 154.

Signal analyzer unit 120 calculates the reception quality and interference signal level on the common control channel based on the information stored in received signal information storage unit 150.

Common control channel reception quality estimation unit 122 retrieves the reception power (CPICH RX) of the common pilot channel from common pilot channel information storage unit 152, and the transmission power (CCCH1 offset, CCCH2, offset) of common control channels 1, 2 from common control channel information storage unit 154, respectively, and calculates the respective reception levels (CCCH1 RX, CCCH2 RX) of common control channels 1, 2 based on these retrieved data in accordance with the following equations:

$$CCCH1RX=CPICHRX+CCCH1offset$$

$$CCCH2RX=CPICHRX+CCCH2offset$$

Interference signal level estimation unit 124 retrieves the total received electric field level (RSSI) and the reception level (CPICH RX) of the common pilot channel from common pilot channel information storage unit 152, and retrieves the reception levels (CCCH1 RX, CCCH2 RX) of common control channels 1, 2 from common control channel reception quality estimation unit 122. Then, interference signal level estimation unit 124 calculates the interference signal level (ICH RX) based on these retrieved data in accordance with the following equation:

$$ICHRX=RSSI-(CPICHRX+CCCH1RX+CCCH2RX)$$

The reception levels of the common control channels and the interference signal level calculated in the foregoing manner are stored in reception quality storage unit 162 and interference signal storage unit 164, respectively.

Second Exemplary Embodiment

This exemplary embodiment stores the reception quality and interference signal level on the common control channel when reception in the past has failed on the common control channel, and immediately searches for a network with which reception can be ensured on the common control channel upon start of call control.

Figure 5:
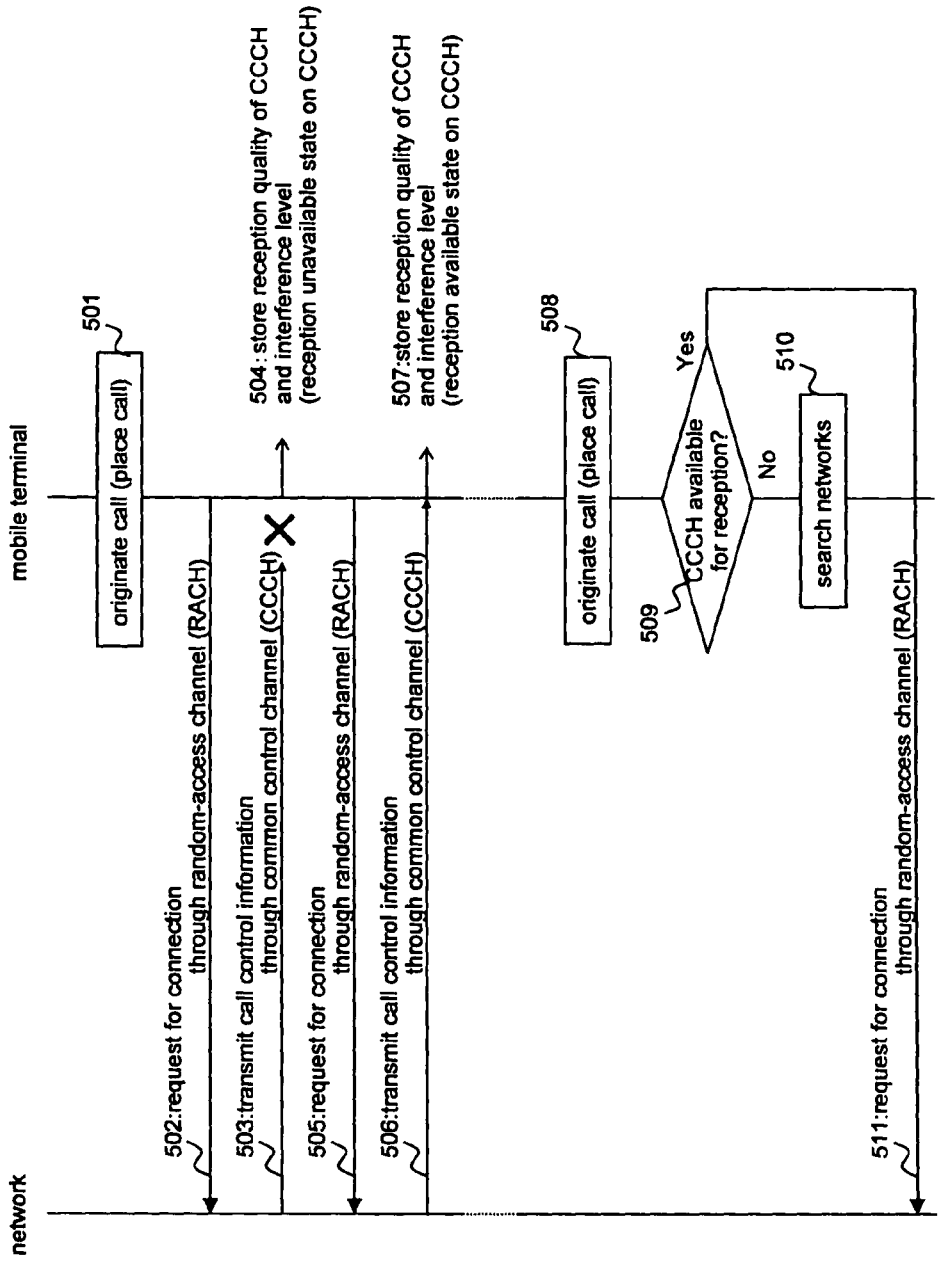

For example, when a mobile terminal originates a call (places a call), a sequence of operations are preformed as illustrated in FIG. 5.

(1) When the mobile terminal originates a call (places a call) (step 501), the mobile terminal first makes a connection request to a network using a random-access channel (RACH) (step 502).

(2) Next, the network transmits call control information to the mobile terminal using the common control channel (CCCH) (step 503).

(3) However, if the mobile terminal cannot receive the call control information on the common control channel, the connection is delayed due to re-transmission on the random-access channel, or the call control itself fails. When reception fails on the common control channel in this way, the mobile terminal stores the reception quality and interference signal level of the common control channel as a statistic (step 504).

(4) On the other hand, when the mobile terminal successfully receives the call control information on the common control channel (steps 505, 506), the mobile terminal also stores the reception quality and interference signal level of the common control channel as a statistic (step 507).

(5) When the mobile terminal originates a call (places a call) the next time (step 508), the mobile terminal immediately searches other cells and networks (step 510) if it cannot receive signals on the common control channel which is at a level at which a call cannot be connected (step 509). The specifications of 3GPP define that a mobile terminal should periodically search adjoining cells and networks of other communication systems, whereas in this exemplary embodiment, the mobile terminal immediately enters a search operation, rather than on a periodic basis, in order to successfully carry out a call connection.

(6) Subsequently, the mobile terminal makes a request to a network that has been found, to make a connection using the random-access channel (step 511).

Figure 6:
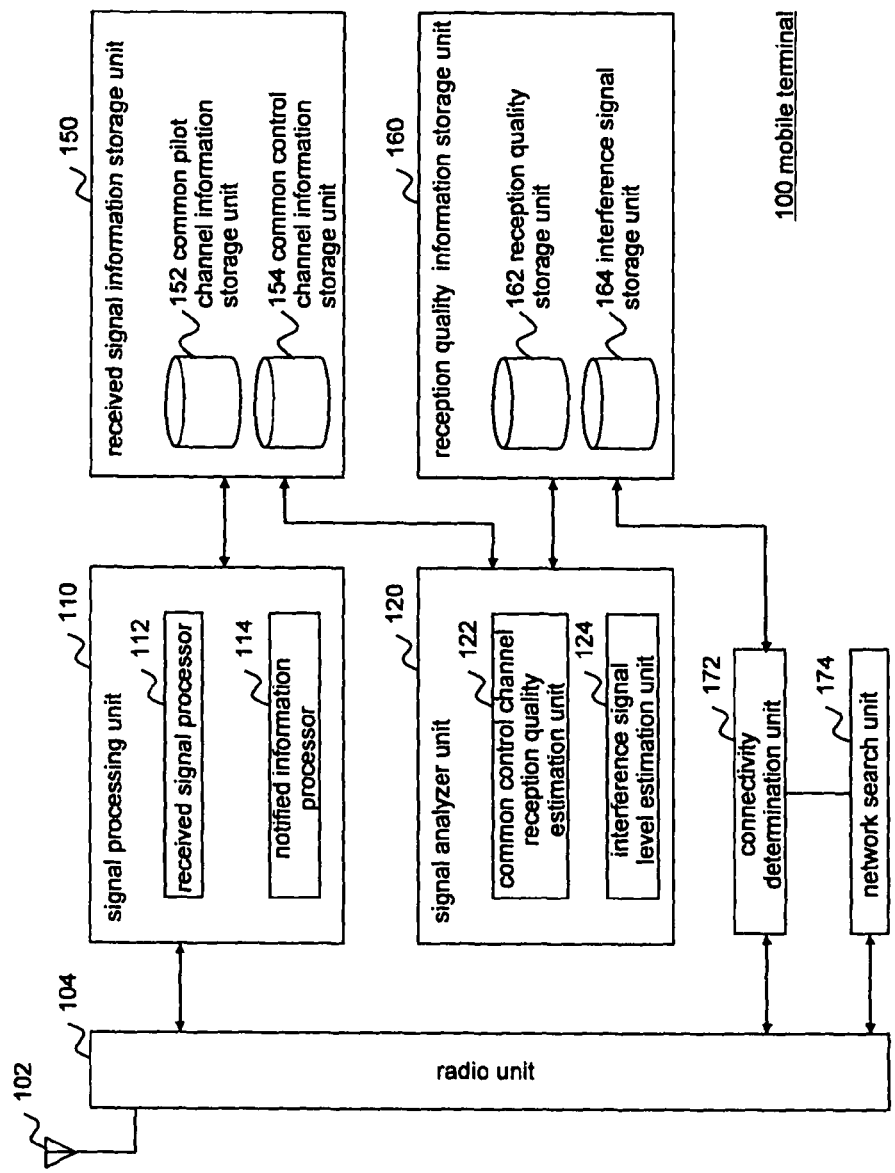

The foregoing flow can be implemented by a CDMA-based mobile terminal in the configuration illustrated in FIG. 6.

In FIG. 6, signal analyzer unit 120 confirms the reception quality of the common control channel and the interference signal level upon originating a call (placing a call) using the approach shown in the aforementioned exemplary embodiment, or the like. Then, signal analyzer unit 120 calculates the reception qualities of the common control channel and interference signal levels for signals which were successfully received and for signals which were unsuccessfully received, based on the information stored in received signal information storage unit 150. The results of the calculations for the signals which were successfully received are stored in reception quality storage unit 162 and interference signal storage unit 164 as reception availability information, while the results of the calculations for the signals which were unsuccessfully received are stored as reception unavailability information. The foregoing function is similar to that described in the first exemplary embodiment.

Connectivity determination unit 172 retrieves the reception unavailability information from reception quality information storage unit 160, and determines whether or not a connection can be made to a network based on the reception unavailability information. In this regard, the reception availability information may be referenced for determining whether or not the connection can be made to the network.

Network search unit 174 searches for another network, if connectivity determination unit 172 determines that the connection cannot be made.

Radio unit 104 makes a connection request to a network extracted by the search made by network search unit 174.

With the foregoing configuration, it is possible to immediately find a network which can ensure the reception on the common control channel upon start of call control.

Third Exemplary Embodiment

In this exemplary embodiment, in order to additionally support the reception of signals (for example, a call arrival signal) on the common control channel which is not triggered by the operation of the mobile terminal as described above, information on a sequence number and the timing of a previous transmission is included in a call arrival signal transmitted from the network to the mobile terminal while the mobile terminal is in a waiting state. In this way, the mobile terminal which receives a call arrival signal can recognize the reception quality of the call arrival signal that is (not) be received.

Then, the mobile terminal stores as a statistic the reception quality of a call arrival signal and an interference signal level when it fails to receive the call arrival signal, and immediately searches for a network from which the call arrival signal can always be received during a waiting state.

For example, when a call is directed from the network to the mobile terminal (arrival of call), the network notifies the mobile terminal of the arrival of call using a paging channel (PCH), and the mobile terminal makes a connection request to the network using a random-access channel (RACH).

Figure 7:
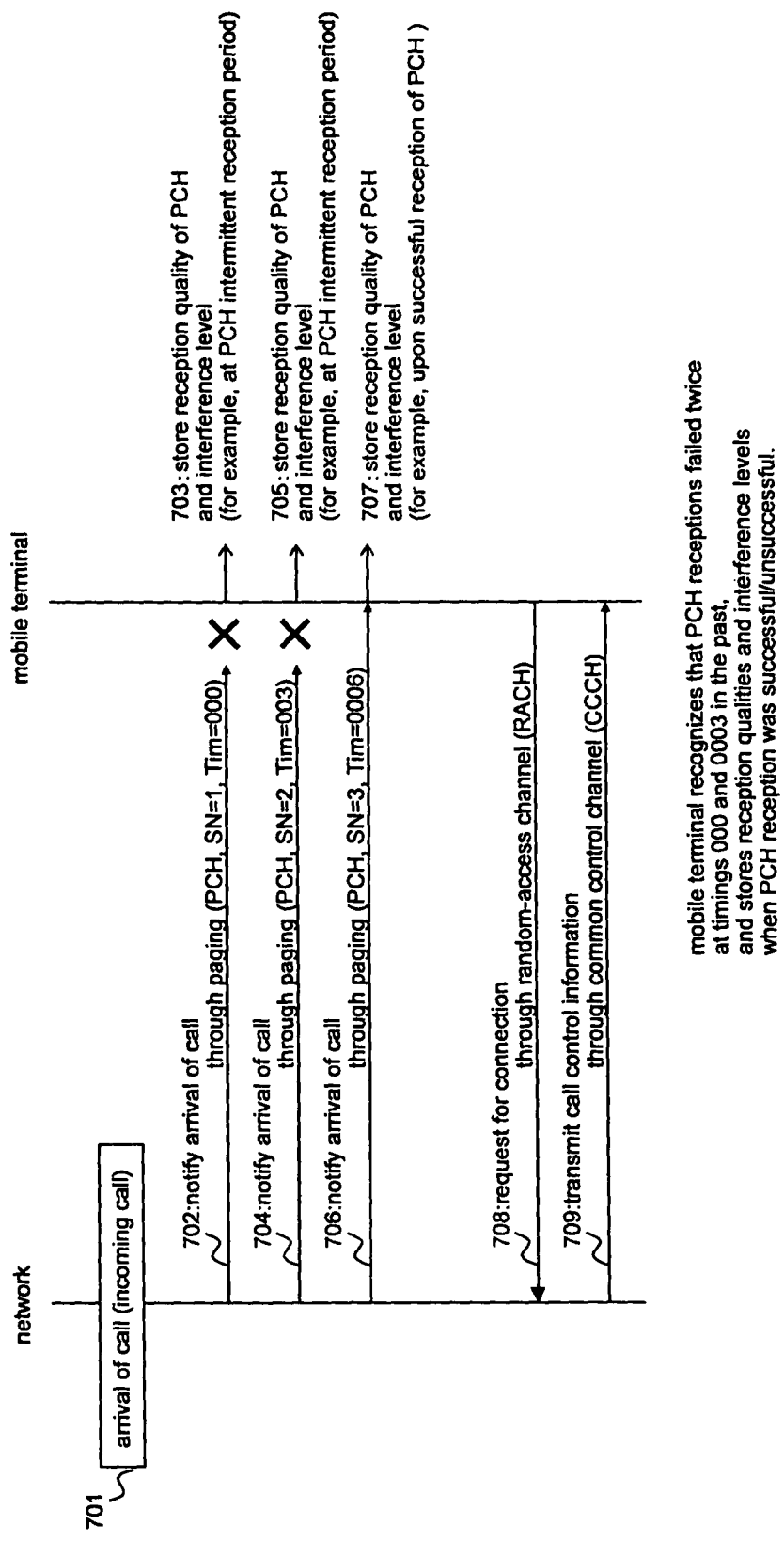

However, when the mobile terminal cannot receive signals on the common control channel (PCH in this case), the connection is delayed due to re-transmission from the network, or arrival of the call itself fails. To prevent this, a sequence of operations is performed as illustrated in FIG. 7.

(1) When a call is directed from the network to the mobile terminal (arrival of call) (step 701), the network first notifies the mobile terminal of the arrival of the call using PCH (sequence number 1, timing 000) (step 702).

(2) When the mobile terminal fails to receive signal on PCH, the mobile terminal periodically monitors the reception quality of PCH and the interference signal level (for example, at an intermittent reception period). Then, the mobile terminal stores the reception quality of PCH and the interference signal level when it fails to receive signal on PCH (step 703).

(3) Next, the network again notifies the mobile terminal of the arrival of call using PCH (sequence number 2, timing 003) (step 704).

(4) When the mobile terminal fails to receive signal on PCH, the mobile terminal periodically monitors the reception quality of PCH and the interference signal level (for example, at an intermittent reception period). Then, the mobile terminal stores the reception quality of PCH and the interference signal level when it fails to receive signal on PCH (step 705).

(5) Next, the network again notifies the mobile terminal of the arrival of call using PCH (sequence number 3, timing 004) (step 706).

(6) When the mobile terminal successfully receives signal on PCH, the mobile terminal stores the reception quality of PCH and the interference signal level when it successfully receives on PCH (step 707).

(7) Subsequently, the mobile terminal makes a connection request to the network using the random-access channel (RACH) (step 708), and the network transmits call control information to the mobile terminal using the common control channel (CCCH) (step 709).

In this way, the mobile terminal recognizes that it has failed to receive signal on PCH twice in the past from the sequence numbers and timings included in PCH received from the network, and stores the reception quality of PCH and the interference signal level when it failed to receive signal on PCH.

The foregoing flow can be implemented by the CDMA-based mobile terminal in the configuration illustrated in FIG. 6.

In FIG. 6, signal analyzer unit 120 periodically monitors the reception quality of the common control channel and the interference signal level using the approach shown in the aforementioned exemplary embodiment or the like. Then, signal analyzer unit 120 calculates the reception quality of the common control channel and the interference signal level for signals which were successfully received and for signals which were unsuccessfully received, based on the information stored in received signal information storage unit 150. The results of the calculations for the signals which were successfully received are stored in reception quality storage unit 162 and interference signal storage unit 164 as reception availability information, while the results of the calculations for the signals which were unsuccessfully received are stored as reception unavailability information. The foregoing function is similar to that described in the first exemplary embodiment.

Connectivity determination unit 172 retrieves the reception unavailability information from reception quality information storage unit 160, and determines whether or not a connection can be made with the network based on the reception unavailability information. In this regard, the reception availability information may be referenced for determining whether or not a connection can be made with the network.

Network search unit 174 searches for another network if connectivity determination unit 172 determines that the connection cannot be made.

Radio unit 104 makes a connection request to a network extracted by the search made by network search unit 174.

With the foregoing configuration, it is possible to immediately find a network which can ensure the reception of the signal on the common control channel upon start of call control.

Fourth Exemplary Embodiment

Additionally, in this exemplary embodiment, the mobile terminal stores reception qualities on a common control channel and interference signal levels, when reception of signals on the common control channel has failed in the past, and requests that the network make a transmission on the common control channel, on which reception of signals can be ensured, during a waiting state or upon start of call control.

Specifically, during a waiting state or upon start of call control, the mobile terminal makes a request to the network to change the frequency of the common control channel or the communication system.

Here, by including minimally required information on the changed frequency or on the communication system in the report information transmitted from the network to the mobile terminal, the mobile terminal can change the frequency or communication system to reliably receive signals on the common control channel without individual notifications from the network.

Figure 8:
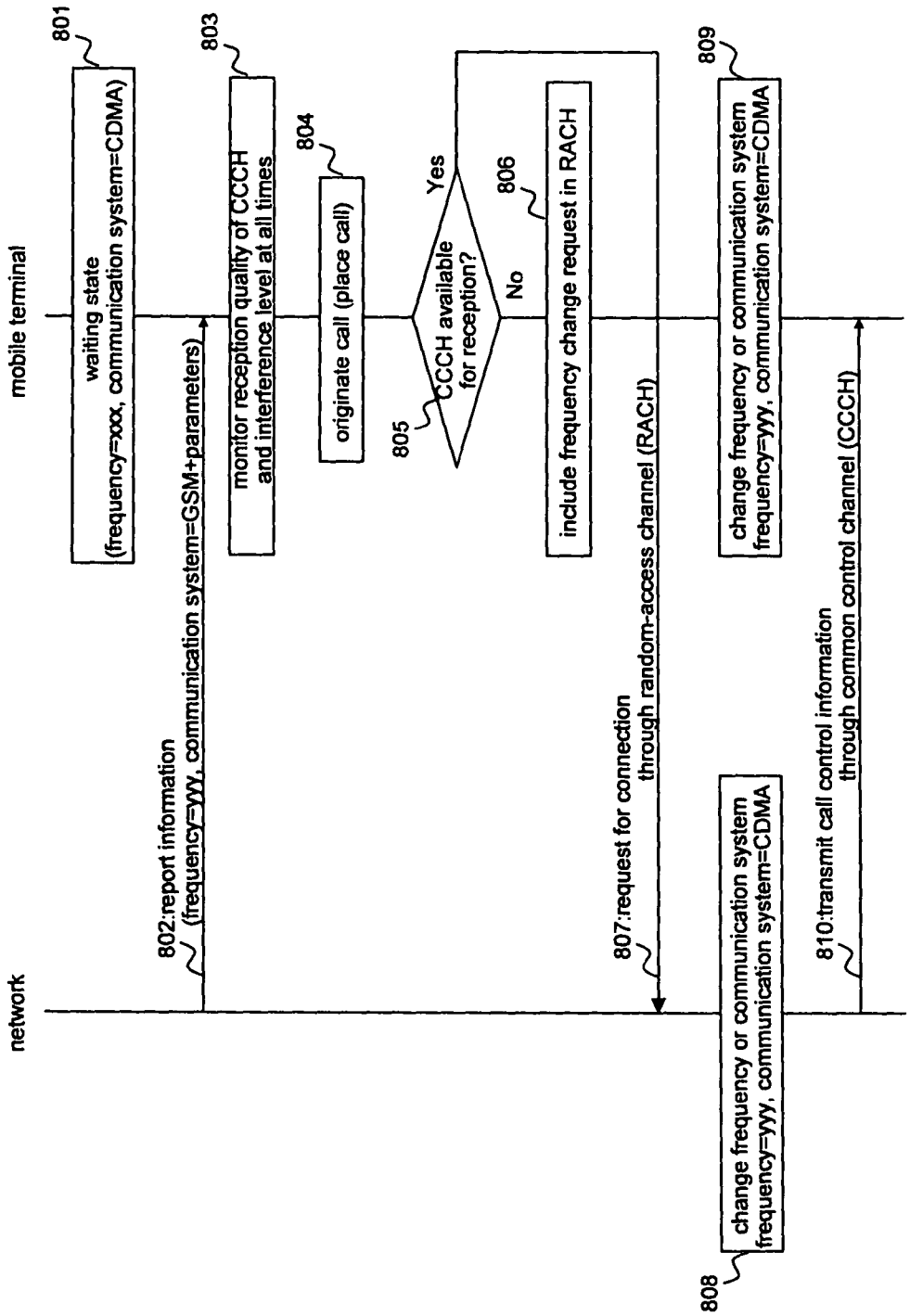

In the following, an example of the sequence in this exemplary embodiment is shown. Here, a sequence of operations is performed as illustrated in FIG. 8.

(1) The mobile terminal is waiting with frequency=xxx and communication system=CDMA (step 801).

(2) In this state, the network notifies the mobile terminal of report information (step 802). In this event, the report information includes a previously provided frequency=yyy and communication system=GSM+parameters.

(3) The mobile terminal always monitors the reception quality of the common control channel (CCCH) and the interference signal level (step 803).

(4) In this state, the user of the mobile terminal performs a call originating (calling) operation (step 804).

(5) In this event, if the reception quality of the common control channel or the interference signal level has fallen to a level at which the reception fails on the communication control channel (step 805), the mobile terminal includes a frequency change request (xxx→yyy) in the random-access channel (RACH) (step 806). Then, the mobile terminal makes a connection request to the network using this random-access channel (step 807).

(6) Subsequently, the network transmits call control information to the mobile terminal using CCCH (step 810). In this event, both the network and mobile terminal use the frequency=yyy and communication system=CDMA (steps 808, 809).

In this exemplary embodiment, in order to more effectively change the frequency, a frequency dedicated to the common control channel may be provided on the network. In this way, the mobile terminal can reliably receive signals on the common control channel without experiencing interference of individual traffic channels of other users during communications, or without affecting the communication qualities of other users.

Also, since the communication qualities of other users are not affected by providing a frequency dedicated to the common control channel, the transmission power of the common control channel can be controlled in response to an individual request from a mobile terminal.

Figure 9:
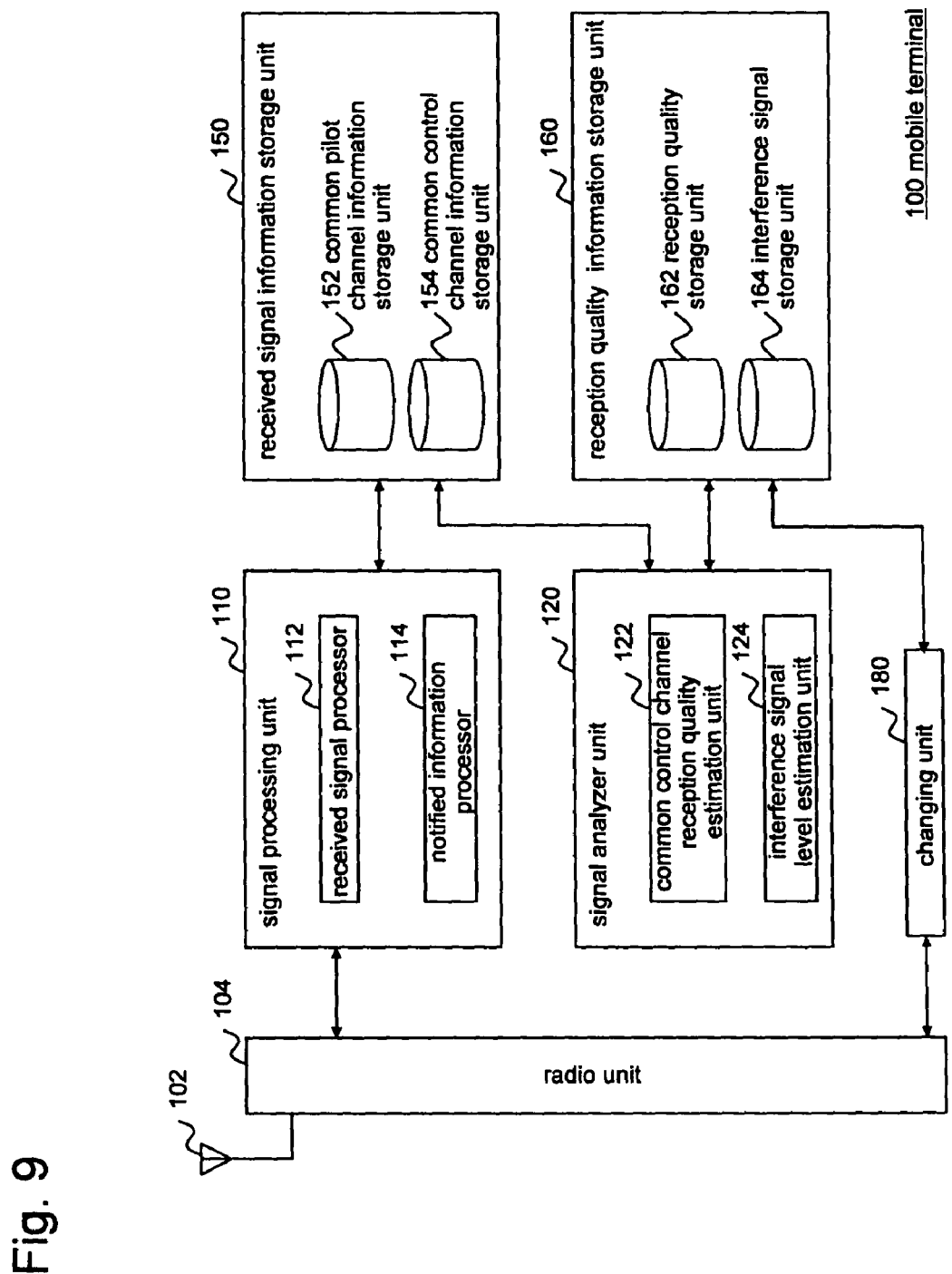

The foregoing flow can be implemented by a CDMA-based mobile terminal in the configuration illustrated in FIG. 9.

In FIG. 9, signal analyzer unit 120 periodically monitors the reception quality of the common control channel and the interference signal level using the approach shown in the aforementioned exemplary embodiment or the like. Then, signal analyzer unit 120 calculates the reception quality of the common control channel and the interference signal level for signals which were successfully received and for signals which were unsuccessfully received, based on the information stored in received signal information storage unit 150. The results of the calculations for the signals which were successfully received are stored in reception quality storage unit 162 and interference signal storage unit 164 as reception availability information, while the results of the calculations for the signals which were unsuccessfully received are stored as reception unavailability information. The foregoing function is similar to that described in the first exemplary embodiment.

Here, the report information notified to mobile terminal 100 includes candidates for the frequency of the common control channel or the communication system after the change. Changing unit 180 changes RACH to a predetermined frequency or communication system included in the candidates.

To change RACH, changing unit 180 first makes a request to the network for a change. In this exemplary embodiment, a request is made to change the frequency (xxx→yyy). Next, changing unit 180 changes the frequency on the mobile terminal such that the mobile terminal can also receive call control information at frequency yyy.

With the foregoing configuration, the mobile terminal can make a request to the network for a transmission on the common control channel which can ensure the reception of signals.

Fifth Exemplary Embodiment

In this exemplary embodiment, the mobile terminal determines the transmission power of the common control channel, concerning which a request was made to the network, from the reception quality on the common pilot channel which is measured during a waiting state or upon start of call control, the reception quality of the common control channel and the interference signal level which are estimated from power information on the common control channel notified from the network, and the reception levels of the common control channel and interference signal levels stored as a statistic in the past when reception of signals failed on the common control channel.

For example, when the mobile terminal originates a call (places a call), a sequence of operations is performed as follows.

(1) First, the mobile terminal makes a request that to the network that a connection be made using a random-access channel (RACH).

(2) Next, the network transmits call control information to the mobile terminal using the common control channel (CCCH).

(3) The mobile terminal fails to receive signals on CCCH. In this event, the mobile terminal monitors the reception quality of CCCH and the interference signal level.

(4) Next, the mobile terminal calculates a power difference (CCCH power up) required for the reception of signals on CCCH in the following manner:

$$CCCH \text{ power up} = \text{Reception Quality at which Reception is Statistically Successful} - \text{Reception Quality of Current } CCCH$$

(5) The mobile terminal again transmits a connection request to the network using the random-access channel (RACH). In this event, CCCH power up is included in RACH.

(6) The network again transmits the call control information to the mobile terminal using the common control channel (CCCH).

Figure 10:
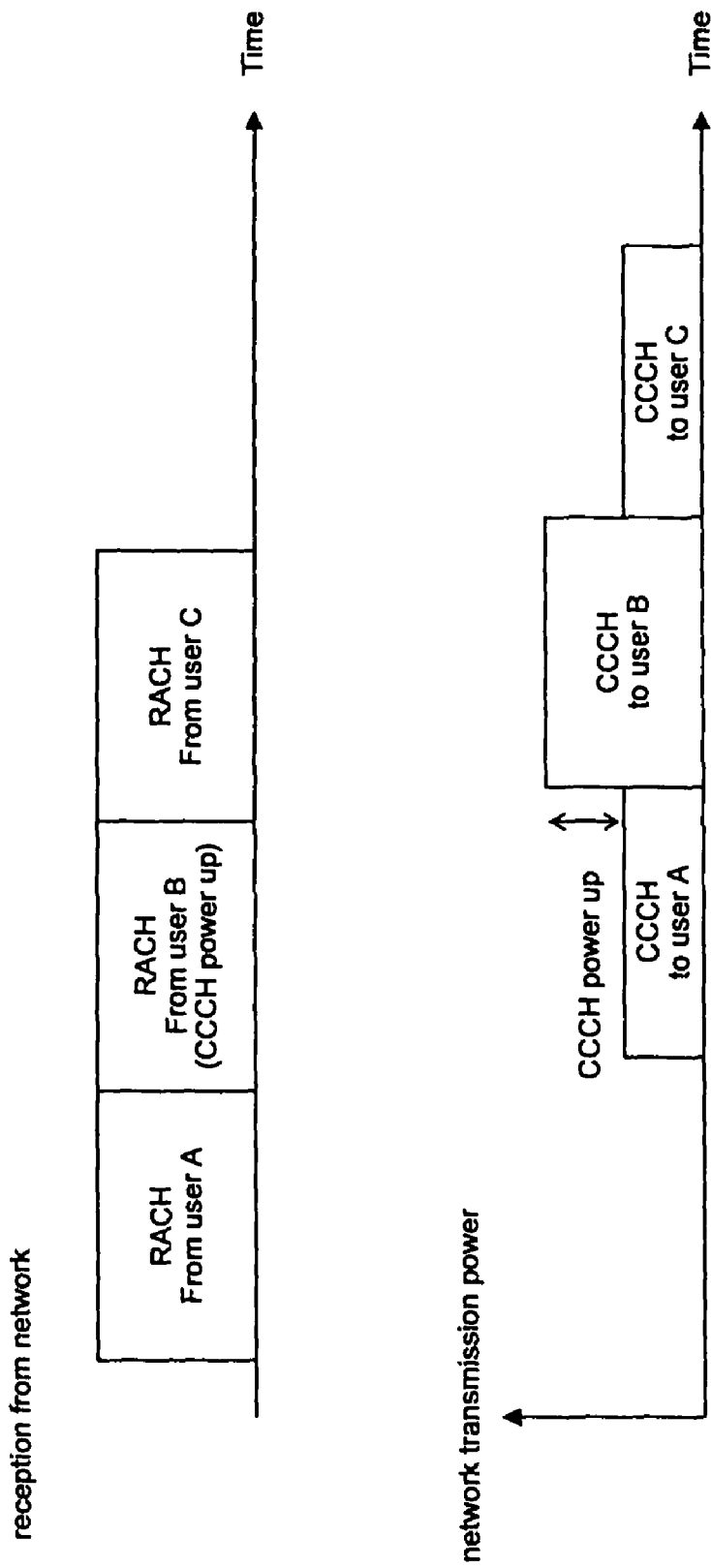

In this event, the network increases the transmission power by CCCH power up for only a CCCH frame that is to be sent to the mobile terminal which has made the CCCH power up request (mobile terminal of user B in FIG. 10), and transmits the resulting CCCH frame. The network does not change the transmission power of CCCH frames that are to be sent to mobile terminals which do not make the CCCH power up request (mobile terminals of users A, C in FIG. 10).

(7) In this way, the mobile terminal successfully receives signals on CCCH.

(8) Subsequently, the mobile terminal and network start a call control sequence using an individual channel. In this event, the network returns the CCCH transmission power intended for the mobile terminal, which has made the CCCH power up request, to an initial state.

The foregoing flow can be implemented by a CDMA-based mobile terminal in the configuration illustrated in FIG. 11. In FIG. 11, signal analyzer unit 120 generates the following first information and second information.

(i) First Information:

Information which includes the reception quality of the common control channel and the interference signal level calculated based on the reception quality on the common pilot channel which is measured during a waiting state or upon start of call control, and the power information extracted from the report information.

(ii) Second Information:

Information which includes the reception level of the common control channel and the interference signal level when reception of signal failed.

Transmission power determination unit 170 determines the transmission power of the common control channel concerning which a requested was made to the network, based on the first information and the second information. While a variety of aspects can be employed for a method of determining the transmission power value, this exemplary embodiment determines the transmission power through the flow described above.

According to the foregoing configuration, stable and reliable reception can be carried out.

As described above, by employing the configurations of the foregoing exemplary embodiments, the CDMA-based mobile terminal can reduce the probabilities of failed call connection due to unsuccessful reception on the common control channel and a delay in connection due to re-transmission.

This is because the mobile terminal estimates the reception quality of the common control channel and the interference signal level from the reception quality of the common pilot channel and the power information on the common control channel that has been notified from the network, stores situations as a statistic when the reception failed on the common control channel in the past, searches adjoining cells and network during a waiting state or upon start of call connection so as to ensure that the common control channel can be received, and makes a request to the network that the frequency or communication system be changed.

This is also because the network controls the transmission power of the common control channel in response to a request from the mobile terminal by providing a frequency dedicated to the common control channel, without experiencing interference of individual traffic channels or while preventing the influence on the reception qualities of other users.

While exemplary embodiments of the present invention have been described with reference to the drawings, they are illustrative of the present invention, and a variety of configurations can also be employed in addition to the foregoing. Also, the configurations of the respective exemplary embodiments can be arbitrarily combined.

The present invention is not limited to the foregoing configurations but also includes the following aspects:

(1) A method of receiving a common control channel for use in call control of a CDMA-based mobile terminal, wherein the method estimates the reception quality of the common control channel and the interference signal level based on the measured reception quality of a common pilot channel, and power information on a control channel notified from a network.

(2) A method of receiving a common control channel for use in call control of a CDMA-based mobile terminal, wherein the method stores the reception quality of the common control channel and the interference signal level when reception of the common control channel has failed in the past, and searches are immediately made, upon start of call control, for a network which ensures that the common control channel can be received.

(3) A method of receiving a common control channel for use in call control of a CDMA-based mobile terminal, wherein the method stores the reception quality of the common control channel and the interference signal level when the reception of the common control channel has failed in the past, and requests are made to a network for a transmission of the common control channel which can always be received, upon start of call control.

(4) A method of receiving a common control channel for use in call control of a CDMA-based mobile terminal, wherein information on a sequence number and the timing of a previous transmission is included in signal (for example, a call arrival signal) on the common control channel which is not triggered by the operation of the mobile terminal that transmits signal from the network, thereby allowing a mobile terminal which receives the common control channel to recognize a reception quality with which the common control channel can (cannot) be received.

(5) A method of receiving a common control channel for use in call control of a CDMA-based mobile terminal, wherein the method stores the reception quality of the common control channel and the interference signal level when reception failed in the past on the common control channel, which is not triggered by the operation of the mobile terminal that transmits signal from the network, and searches are immediately made for a network from which the common control channel can be reliably received.

(6) A method of receiving a common control channel for use in call control of a CDMA-based mobile terminal, wherein the method stores the reception quality of the common control channel and the interference signal level when reception failed in the past on the common control channel, which is not triggered by the operation of the mobile terminal that transmits signal from the network, and a request is made to the network to transmit a common control channel which can always be received.

(7) A method for making a request to a network for a change of a frequency of a common control channel or a communication system during a waiting state or upon start of call control of a CDMA-based mobile terminal.

(8) A method for making a request to a network for a change of a frequency of a common control channel or a communication system during a waiting state or upon start of call control of a CDMA-based mobile terminal, wherein information on a frequency or a communication system after the change is included in report information transmitted from the network, thereby changing the frequency or communication system without receiving an individual notification from the network.

(9) In a CDMA-based mobile communication system, a method of controlling transmission power of a common control channel in response to a request from a mobile terminal by providing a frequency dedicated to the common control channel on a network, without interference of individual traffic channels or while suppressing the influence on reception qualities of other users.

(10) A method for making a request to a network for a change of transmission power of a common control channel during a waiting state or upon start of call control of a CDMA-based mobile terminal.

(11) A method for making a request to a network for a change of transmission power of a common control channel during a waiting state or upon start of call control of a CDMA-based mobile terminal, wherein the transmission power of the common control channel requested to the network is determined from the reception quality of the common control channel and the interference signal level, that estimated from the measured reception quality of a common pilot channel and information on power of a control channel notified from the network, and from the reception level of the common control channel and the interference signal level, stored in the past, at which the reception of the common control channel failed.

The invention claimed is:

1. A CDMA (Code Division Multiple Access)-based mobile terminal comprising:
   a received signal processing unit for measuring the reception quality of a common pilot channel in a received signal;
   a notified information, processing unit for extracting power information related to transmission power of a common control channel from report information notified from a base station;
   a signal analyzer unit for calculating the reception quality of the common control channel and the interference signal level of the common control channel based on the reception quality of the common pilot channel and the power information of the common control channel;

a quality information storage unit for storing the calculated reception quality of the common control channel and the interference signal level of the common control channel as reception unavailability information when reception fails on the common control channel;

a connectivity determination unit for determining whether or not a connection can be made to the network based on the reception unavailability information; and a changing unit for requesting the network to change a frequency of the common control channel or a communication system during a waiting state or upon start of call control when said connectivity determination unit determines that a connection cannot be made.

2. The CDMA-based mobile terminal according to claim 1, further comprising:

a common pilot channel information storage unit for storing the measured reception quality value of the common pilot channel measured by said received signal processing unit; and a common control channel information storage unit for storing the power information of the common control channel extracted by said notified information processing unit.

3. The CDMA-based mobile terminal according to claim 1, wherein said reception quality of the common pilot channel includes information on received power of the common pilot channel.

4. The CDMA-based mobile terminal according to claim 1, wherein said signal analyzer unit calculates the reception quality of the common control channel and the interference signal level of the common control channel when reception fails on the common control channel, and stores the calculated reception quality of the common control channel and the interference signal level of the common control channel in said quality information storage unit as the reception unavailability information.

5. The CDMA-based mobile terminal according to claim 4, wherein said signal analyzer unit calculates the reception quality of the common control channel and the interference signal level of the common control channel when reception is successful on the common control channel, and stores the calculated reception quality of the common control channel the and interference signal level of the common control channel in said quality information storage unit as reception availability information.

6. The CDMA-based mobile terminal according to claim 4, wherein the connectivity determination unit is for retrieving the reception unavailability information from said quality information storage unit to determine whether or not a connection can be made to the network based on the reception unavailability information.

7. The CDMA-based mobile terminal according to claim 6, further comprising a network search unit for searching for a network, wherein said mobile terminal is configured to make a connection request to the network when said connectivity determination unit determines that a connection can be made, and make a connection request to another network found by said network search unit when said connectivity determination unit determines that a connection cannot be made.

8. The CDMA-based mobile terminal according to claim 1, wherein said received signal is intermittently transmitted from the network, and each of the received signals that is intermittently transmitted includes information indicative of a sequence number and a transmission timing.

9. The CDMA-based mobile terminal according to claim 1, wherein said common control channel utilizes a frequency dedicated to the common control channel provided in the network.

10. The CDMA-based mobile terminal according to claim 1, wherein;

said signal analyzer unit is configured to generate first information including the reception quality of the common control channel and the interference signal level calculated based on the reception quality of the common pilot channel measured during a waiting state or upon start of call control and the power information of the common control channel extracted from the report information, and to generate second information including the reception level of the common control channel and the interference signal level of the common control channel at which a reception fails, and said mobile terminal further comprises a transmission power determination unit for determining transmission power of the common control channel, concerning which a request was made to the network, based on the first information and the second information.

11. A CDMA (Code Division Multiple Access)-based mobile terminal comprising:

a received signal processing unit for measuring the reception quality of a common pilot channel in a received signal;

a notified information processing unit for extracting power information related to transmission power of a common control channel from report information notified from a base station;

a signal analyzer unit for calculating the reception quality of the common control channel and the interference signal level of the common control channel based on the reception quality of the common pilot channel and the power information of the common control channel;

a quality information storage unit for storing the calculated reception quality of the common control channel and the interference signal level of the common control channel as reception unavailability information when reception fails on the common control channel;

a connectivity determination unit for determining whether or not a connection can be made to the network based on the reception unavailability information; and a changing unit for requesting the network to change a frequency of the common control channel or a communication system, wherein:

said report information includes candidates for the frequency of the common control channel and the communication system after a change, and said changing unit requests to change to a predetermined frequency of the common control channel or communication system included in the candidates.

12. A communication quality estimating method for estimating the communication quality in a CDMA (Code Division Multiple Access)-based mobile communication, the communication quality estimating method comprising:

measuring the reception quality of a common pilot channel in a received signal;

extracting power information related to the transmission power of a common control channel from report information notified from a base station;

calculating the reception quality of the common control channel and the interference signal level of the common control channel based on the reception quality of the common pilot channel and the power information of the common control channel;

storing the calculated reception quality of the common control channel and the interference signal level of the common control channel as reception unavailability information when reception fails on the common control channel;

determining whether or not a connection can be made to a network based on the reception unavailability information; and requesting the network to change a frequency of the common control channel or a communication system during a waiting state or upon start of call control when determining that a connection cannot be made.

13. The communication quality estimating method according to claim 12, wherein said reception quality of the common pilot channel includes information on the received power of the common pilot channel.

14. A CDMA (Code Division Multiple Access)-based mobile communication method comprising:

measuring the reception quality of a common pilot channel in a received signal, at which reception fails on a common control channel;

extracting power information related to transmission power of a common control channel from report information notified from a base station;

calculating the reception quality of the common control channel on the received signal and the interference signal level of the common control channel based on the reception quality of the common pilot channel and the power information of the common control channel;

storing the calculated reception quality of the common control channel and the interference signal level of the common control channel as reception unavailability information;

determining whether or not a connection can be made to a network based on the reception unavailability information; and requesting the network to change the frequency of the common control channel or a communication system during a waiting state or upon start of call control when determining that a connection cannot be made at said determining of whether or not a connection can be made to the network.

15. The mobile communication method according to claim 14, comprising making a connection request to the network upon determining that a connection can be made to the network, and making a connection request to another network upon determining that a connection cannot be made to the network.

16. The mobile communication method according to claim 14, wherein:

said report information includes candidates for the frequency of the common control channel and the communication system after a change, and said requesting the change of the frequency or communication system includes changing to a predetermined frequency or communication system included in the candidates.

17. The mobile communication method according to claim 14, wherein said received signal is intermittently transmitted from the network, and each of the received signals that is intermittently transmitted includes information indicative of a sequence number and a transmission timing.

18. The mobile communication method according to claim 14, wherein said common control channel utilizes a frequency dedicated to the common control channel provided in the network.

19. The mobile communication method according to claim 14, further comprising:

generating first information including the reception quality of the common control channel and an interference signal level of the common control channel calculated based on a reception quality of the common pilot channel measured during a waiting state or upon start of call control and the power information of the common control channel extracted from the report information, and generating second information including a reception level of the common control channel and the interference signal level of the common control channel when a reception fails; and determining transmission power of the common control channel requested to the network based on the first information and the second information.

* * * * *